US007333401B2

(12) United States Patent
Kawakami

(10) Patent No.: US 7,333,401 B2
(45) Date of Patent: Feb. 19, 2008

(54) TIMEPIECE DIAL AND TIMEPIECE

(75) Inventor: Atsushi Kawakami, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/709,127

(22) Filed: Feb. 22, 2007

(65) Prior Publication Data

US 2007/0195651 A1 Aug. 23, 2007

(30) Foreign Application Priority Data

Feb. 23, 2006 (JP) ............................ 2006-047540

(51) Int. Cl.
*G04B 19/06* (2006.01)
*D06N 7/04* (2006.01)
*B32B 27/36* (2006.01)
*B32B 15/04* (2006.01)

(52) U.S. Cl. ..................... 368/232; 428/149; 428/412; 428/448; 428/450

(58) Field of Classification Search ........ 368/232–235; 428/148, 149, 412, 428, 448, 450
See application file for complete search history.

(56) References Cited

U.S. PATENT DOCUMENTS 3,793,824 A * 2/1974 Simon-Vermot et al. .... 368/232
5,782,995 A 7/1998 Nanya et al.
5,912,064 A * 6/1999 Azuma et al. .............. 428/141
6,229,766 B1 * 5/2001 Saurer et al. ............... 368/205
6,538,959 B1 3/2003 Yamaguchi et al.
2002/0027620 A1 * 3/2002 Platz et al. ................... 349/27
2006/0028920 A1 2/2006 Kojima et al.

FOREIGN PATENT DOCUMENTS

GB 1-391230 A 4/1975
JP S63-033692 A 2/1988
JP H03-073438 A 3/1991
JP 2003-511867 A 3/2003
JP 2003-239083 A 8/2003
JP 2004-078725 A 3/2004
JP 2004-294281 A 10/2004
JP 2004-309475 A 11/2004
JP 3670282 B2 4/2005
JP 2005-189019 A 7/2005
WO WO98/53373 11/1998
WO WO-2006/006390 A 1/2006

* cited by examiner

*Primary Examiner*—Vit W Miska
(74) *Attorney, Agent, or Firm*—Global IP Counselors, LLP

(57) ABSTRACT

A timepiece dial having a base member made primarily of polycarbonate, a silicon compound layer made primarily of a silicon oxide compound, and a zinc sulfide compound layer made primarily of a zinc sulfide compound and rendered on the opposite side of the silicon compound layer as the side facing the base member.

12 Claims, 3 Drawing Sheets

TIMEPIECE DIAL AND TIMEPIECE

BACKGROUND

1. Technical Field

The present invention relates to a dial for a timepiece and to a timepiece.

2. Related Art

Both excellent readability for practical use and an excellent appearance for decorative purposes are needed in timepiece dials. To meet both of these needs, gold, silver, and other metals have therefore traditionally been used to manufacture timepiece dials.

Japanese Unexamined Patent Appl. Pub. JP-A-2003-239083 (particularly page 4, left column, lines 37 to 42) also teaches using plastic as the base and coating the plastic with a metal film as a means of reducing manufacturing cost and affording greater freedom molding the timepiece dials.

Adhesion between plastic and metal is generally poor. The coating therefore separates easily from the base material, and this timepiece dial therefore suffers from low durability.

In a radio-controlled timepiece or solar-powered timepiece (such as a clock with a solar cell), the timepiece dial must also be transparent to electromagnetic waves (including radio frequency signals and light). Plastic is therefore commonly used for the timepiece dial, but because plastic lacks a sense of quality, the dial is often coated with a metallic film in order to approve the appearance of the dial. As already noted, however, adhesion between plastic and metal is poor. The metal film rendered on the plastic base must also be quite thin in order to improve transmission of electromagnetic energy (including radio waves and light waves), and this degrades the overall appearance of the timepiece dial.

SUMMARY

A timepiece dial and a timepiece having a timepiece dial according to preferred aspects of the invention provide excellent transmittance to electromagnetic energy (including radio waves and light waves) as well as an excellent appearance and durability.

A timepiece dial according to a preferred aspect of the invention has a base member made primarily of polycarbonate, a silicon compound layer made primarily of a silicon oxide compound, and a zinc sulfide compound layer made primarily of a zinc sulfide compound and rendered on the opposite side of the silicon compound layer as the side facing the base member.

The resulting timepiece dial offers outstanding transparency to electromagnetic waves (light and radio frequency signals) in addition to an outstanding appearance and durability.

Preferably, the silicon compound layer of this timepiece dial is primarily $SiO_2$.

This affords high transparency to electromagnetic waves (radio frequency signals and light) while affording a timepiece dial with an excellent appearance and durability.

Yet further preferably, the thickness of the silicon compound layer is 20 nm to 200 nm.

This affords high transparency to electromagnetic waves (radio frequency signals and light) while affording a timepiece dial with an excellent appearance.

Yet further preferably, the thickness of the zinc sulfide compound layer in this timepiece dial is 10 nm to 100 nm.

This affords high transparency to electromagnetic waves (radio frequency signals and light) while affording a timepiece dial with an excellent appearance.

Yet further preferably, the combined thickness of the silicon compound layer and the zinc sulfide compound layer is 50 nm to 250 nm.

This affords high transparency to electromagnetic waves (radio frequency signals and light) while affording a timepiece dial with an excellent appearance.

In another aspect of the invention the timepiece dial also has a polarizer having the ability to polarize incident light disposed to the opposite side of the base member as the side on which the zinc sulfide compound layer is disposed.

This affords high transparency to light while affording a timepiece dial with an excellent appearance.

Yet further preferably, the timepiece dial also has a color layer composed of a material including a coloring agent between the base member and the polarizer.

This affords a timepiece dial with a particularly attractive appearance.

Yet further preferably, the color layer is made from a material that is sticky and adhesive.

This improves adhesion of the polarizer to the base member, thereby improves the durability of the timepiece dial (particularly impact resistance), and affords a timepiece dial that is particularly reliable as both a practical and a decorative product.

The timepiece dial according to another aspect of the invention also has a diffusion layer composed of a material containing a diffusion agent having the ability to disperse incident light, the diffusion layer being disposed between the base member and the polarizer.

This arrangement affords a particularly attractive timepiece dial with a high luster that exudes high quality.

Yet further preferably, the diffusion layer is made from a material that is sticky and adhesive.

This improves adhesion of the polarizer to the base member, thereby improves the durability of the timepiece dial (particularly impact resistance), and affords a timepiece dial that is particularly reliable as both a practical and a decorative product.

Yet further preferably, the color of the timepiece dial at the surface on the side to which the zinc sulfide compound layer is disposed has an a* value of −10 to 10 and a b* value of −10 to 10 in the L*a*b* color space defined in JIS Z 8729.

This creates a timepiece dial with a particularly attractive appearance.

A timepiece according to another aspect of the invention has the timepiece dial according to the invention.

This affords a timepiece with an excellent appearance and excellent durability. The invention also affords timepieces, such as radio-controlled timepieces, solar clocks, and solar-powered radio-controlled timepieces, that can effectively utilize electromagnetic energy such as RF signals and light from outside sources.

A timepiece dial and a timepiece having a timepiece dial according to preferred aspects of the invention thus provide excellent transmittance to electromagnetic energy (including radio waves and light waves) as well as an excellent appearance and durability.

Other objects and attainments together with a fuller understanding of the invention will become apparent and appreciated by referring to the following description and claims taken in conjunction with the accompanying drawings.

DESCRIPTION OF EXEMPLARY EMBODIMENTS

Preferred embodiments of the present invention are described below with reference to the accompanying figures.

A preferred embodiment of a timepiece dial according to the present invention is described first below.

Timepiece Dial, First Embodiment

Figure 1:
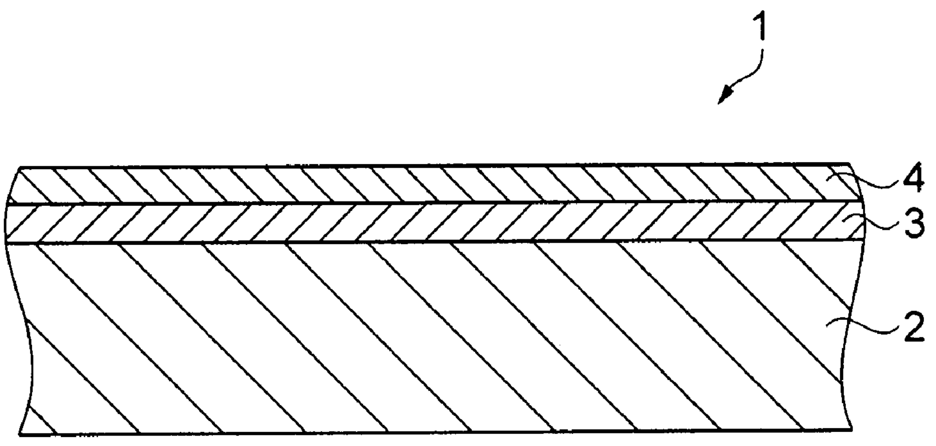
FIG. 1 is a section view of a timepiece dial according to a first embodiment of the invention.

FIG. 1 is a section view of a timepiece dial according to a first embodiment of the invention.

As shown in FIG. 1 the timepiece dial 1 according to this embodiment of the invention has a base layer 2 that is made mainly from polycarbonate, a silicon compound layer 3 that is made mainly from a silicon oxide compound, and a zinc sulfide layer 4 that is made from a zinc sulfide compound and is rendered on the silicon compound layer 3 on the opposite side as the base layer 2.

That a part is made "mainly" or "primarily" from a material herein means that the content of that material is higher than the content of any other materials used to manufacture the part of interest. While the content ratio is not specifically limited, the content of the main constituent is preferably at least 60 wt %, is preferably at least 80 wt %, and is yet further preferably greater than or equal to 90 wt %.

The side of the base layer 2 on which the silicon compound layer 3 and zinc sulfide layer 4 are rendered is preferably the exposed side of the timepiece dial 1 according to this embodiment of the invention so that this side of the base layer 2 is visible to the user, but the invention is not so limited. Unless otherwise specified below, the timepiece dial 1 is described as being used with the surface of the base layer 2 that is coated by the silicon compound layer 3 and zinc sulfide layer 4 (the top side as seen in the figures) facing the outside of the timepiece.

Materials

The base layer 2 is made from materials containing mainly polycarbonate. One required property of the base layer 2 is transparency to electromagnetic energy (including radio waves and light waves). Of the different types of plastics available, polycarbonate offers particularly high optical transparency and outstanding electromagnetic energy transmittance, and can therefore be used to render a base layer 2 with an outstanding electromagnetic energy transmittance characteristic. Differences in the refractive indices of the polycarbonate base layer 2 and the silicon compound layer 3 described below cause incident light to be desirably reflected and refracted by the base layer 2 surface on the opposite side as the side covered by the silicon compound layer 3 (the bottom side as seen in the figure) and at the interface between the base layer 2 and the silicon compound layer 3. This difference in refractive indices can therefore be used to render the timepiece dial 1 with a particularly attractive aesthetic design.

Polycarbonate is also resistance to deformation caused by external stress from light and heat, for example. Adhesion between this polycarbonate base layer 2 and the silicon compound layer 3 described below is therefore particularly good, thus affording outstanding durability in the timepiece dial 1.

Rendering the base layer 2 from a material containing polycarbonate also affords a particularly strong timepiece dial 1. Using polycarbonate also affords a high degree of freedom molding the base layer 2 (that is, makes molding easier) during timepiece dial 1 manufacture, and thus enables easily and reliably manufacturing timepiece dials 1 with complex shapes. Yet further, polycarbonate is a relatively low price plastic, which further helps to reduce the manufacturing cost of the timepiece dial 1.

The base layer 2 can also include other materials in addition to polycarbonate, including plasticizers, antioxidizing agents, coloring agents (including color-producing agents, fluorescent materials, and phosphorescent materials), luster agents, brighteners, and fillers. If the base layer 2 is made from a material containing a coloring agent, for example, the timepiece dial 1 can be rendered in a wide range of colors.

The refractive index of the primarily polycarbonate base layer 2 is not specifically limited but is preferably 1.55 to 1.60, and further preferably is 1.58 to 1.59. Light can therefore be desirably reflected and refracted at the interface between the base layer 2 and the silicon compound layer 3, and at the surface of the base layer 2 on the opposite side as the surface that is covered by the silicon compound layer 3. A timepiece dial 1 with an extremely pleasing appearance can therefore be provided.

The thickness of the base layer 2 is not specifically limited, but is preferably 150 μm to 700 μm, more preferably is 200 μm to 600 μm, and is further preferably 300 μm to 500 μm. Rendering the thickness of the base layer 2 within this range effectively helps to prevent increasing the thickness of the timepiece in which the timepiece dial 1 is used while affording excellent mechanical strength and shape stability in the timepiece dial 1. Increasing the thickness of the base layer 2 beyond this range tends to reduce both electromagnetic transparency and the visual appeal of the timepiece dial 1. Because polycarbonate has a low refractive index, however, if the thickness of the base layer 2 is within this range, variation in the thickness of the base layer 2 creates no apparent difference in appearance or electromagnetic transparency and the timepiece dial 1 can be rendered with an excellent appearance and excellent electromagnetic transparency.

The base layer 2 can be molded using any suitable process, but preferred molding methods for the base layer 2 include compression molding, extrusion molding, and injection molding.

Silicon Oxide Compound Layer

The silicon compound layer 3 made primarily of a silicon oxide compound is rendered on the surface of the base layer 2.

Silicon oxide compounds have excellent electromagnetic transparency compared with other metallic oxides, and can be used to provide outstanding electromagnetic transparency in the timepiece dial 1 having this silicon compound layer 3. The refractive index of the silicon compound layer 3 is also lower than the base layer 2, which is primarily made of polycarbonate, and the difference in the refractive indices of the silicon compound layer 3 and the polycarbonate base layer 2 causes light incident to the interface between the base layer 2 and the silicon compound layer 3 to be desirably reflected and refracted.

The refractive index of the silicon compound layer 3 is also lower than the refractive index of the zinc sulfide layer 4, thus causing light incident to the interface between the silicon compound layer 3 and the zinc sulfide layer 4 to be desirably reflected and refracted. The timepiece dial 1 can therefore be rendered with a particularly attractive appearance.

Silicon oxide compounds also have a high affinity for polycarbonate and zinc sulfide compounds, and are resistant to deformation caused by external stress from light and heat, for example. The silicon compound layer 3 therefore affords excellent adhesion with the polycarbonate base layer 2 and the zinc sulfide layer 4. The durability of the timepiece dial 1 is therefore excellent.

Furthermore, while silicon oxide compounds offer high affinity to polycarbonate, the affinity between zinc sulfides and polycarbonate is low. However, by interposing a silicon compound layer 3 between the base layer 2 and the zinc sulfide layer 4 described below, the timepiece dial 1 is significantly more durable than a timepiece dial having a zinc sulfide layer rendered directly on the base layer.

Furthermore, the silicon compound layer 3 is resistant to cracking and exfoliation from the base layer 2 at the interface to the silicon compound layer 3 even when the silicon compound layer 3 is relatively thick. A relatively thick silicon compound layer 3 can therefore be used while still affording excellent electromagnetic transparency and a timepiece dial 1 with a pleasing appearance.

The refractive index of the silicon compound layer 3 is not specifically limited, but is preferably 1.20 to 1.60, and further preferably 1.40 to 1.50. Light can therefore be desirably reflected and refracted at the interfaces between the silicon compound layer 3 and the base layer 2 and zinc sulfide layer 4, thus affording a particularly attractive timepiece dial 1.

If $n_3$ is the refractive index of the silicon compound layer 3 and $n_2$ is the refractive index of the polycarbonate base layer 2, the refractive index difference $n_2-n_3$ between the silicon compound layer 3 and the base layer 2 is preferably 0.05-0.30, and further preferably is 0.07-0.20. This enables desirably reflecting and refracting incident light at the interface between the silicon compound layer 3 and the base layer 2, and affords a timepiece dial 1 with a particularly attractive appearance.

The silicon oxide compound used in the silicon compound layer 3 could be SiO or $SiO_2$, for example, but a composition of primarily $SiO_2$ is preferable. Using primarily $SiO_2$ affords superior transparency to electromagnetic waves, desirably reflects and refracts light at the silicon compound layer 3 to base layer 2 interface and the silicon compound layer 3 to zinc sulfide layer 4 interface, and affords a timepiece dial 1 with a particularly attractive appearance.

The thickness of the silicon compound layer 3 is also not particularly limited, but is preferably 20-200 nm, is further preferably 30-150 nm, and is yet further preferably 50-100 nm. Rendering the thickness of the silicon compound layer 3 within this range affords sufficiently high transparency to electromagnetic waves (including radio waves and light) while also affording a timepiece dial 1 with a particularly attractive appearance.

If the thickness of the silicon compound layer 3 is less than this lower limit it becomes difficult to sufficiently reflect and refract light depending upon the thickness of the zinc sulfide layer 4, and it could become difficult to achieve an attractive appearance.

Furthermore, if the thickness of the silicon compound layer 3 is greater than this upper limit, the timepiece dial 1 may not be sufficiently transparent to electromagnetic waves. In addition, if the thickness of the silicon compound layer 3 is greater than this upper limit, appearance problems such as cracks in the silicon compound layer 3 and separation at the silicon compound layer 3 to zinc sulfide layer 4 interface can result when the timepiece dial 1 is subject to external stress (including heat and light) due to differences in the shrinkage rate of the silicon compound layer 3 and base layer 2.

Zinc Sulfide Layer

A zinc sulfide layer 4 made of mainly a zinc sulfide compound is disposed on the opposite side of the silicon compound layer 3 as the base layer 2. This layered arrangement of a base layer 2 made of a material containing polycarbonate for transparency to electromagnetic waves covered by a silicon compound layer 3 which is then covered by a zinc sulfide layer 4 renders the timepiece dial 1 with excellent transparency to electromagnetic waves while also affording a timepiece dial with a particularly attractive appearance.

The zinc sulfide compound used for the zinc sulfide layer 4 is a compound of Zn and S. The zinc sulfide compound is generally a colorless transparent material with excellent transparency to electromagnetic waves, and affords particularly excellent electromagnetic transparency in a timepiece dial 1 using this zinc sulfide layer 4.

Furthermore, because the refractive index of the zinc sulfide layer 4 is higher than the refractive index of the silicon compound layer 3, the difference in the refractive indices of the zinc sulfide layer 4 and silicon compound layer 3 enables desirably reflecting and refracting incident light at the interface between the silicon compound layer 3 and zinc sulfide layer 4. This affords a timepiece dial 1 with a particularly attractive appearance.

Zinc sulfide compounds also have high affinity for silicon oxide compounds and are resistant to deformation caused by external stress from heat and light, for example, and the zinc sulfide layer 4 therefore also has excellent adhesion with the silicon compound layer 3. The durability of the timepiece dial 1 is therefore excellent.

The refractive index of the zinc sulfide layer 4 is not specifically limited, but is preferably 2.20 to 2.60, and further preferably 2.30 to 2.35. Light can therefore be desirably reflected and refracted at the interface between the 4 and the silicon compound layer 3, thus affording a particularly attractive timepiece dial 1.

If $n_4$ is the refractive index of the zinc sulfide layer 4, the refractive index difference $n_4-n_3$ between the zinc sulfide layer 4 and the silicon compound layer 3 is preferably 0.60-1.40, and further preferably is 0.80-1.20. This enables desirably reflecting and refracting incident light at the interface between the zinc sulfide layer 4 and the silicon compound layer 3, and affords a timepiece dial 1 with a particularly attractive appearance.

The difference $n_2-n_3$ of the refractive indices of the base layer 2 and the silicon compound layer 3, and the difference $n_4-n_3$ of the refractive indices of the zinc sulfide layer 4 and the silicon compound layer 3, both preferably satisfy the above conditions, and the difference $n_4-n_2$ between the refractive indices of the zinc sulfide layer 4 and the base layer 2 is preferably 0.5-1.4 and further preferably is 0.7-1.2. This enables desirably reflecting and refracting incident light at the adjacent interfaces between the base layer 2, the silicon compound layer 3, and the zinc sulfide layer 4, and affords a timepiece dial 1 with a particularly attractive appearance.

The thickness of the zinc sulfide layer 4 is also not particularly limited, but is preferably 10-100 nm, is further preferably 15-80 nm, and is yet further preferably 20-50 nm. Rendering the thickness of the zinc sulfide layer 4 within this range affords sufficiently high transparency to electromagnetic waves (including radio waves and light) while also affording a timepiece dial 1 with a particularly attractive appearance.

If the thickness of the zinc sulfide layer 4 is less than this lower limit it becomes difficult to sufficiently reflect and refract light depending upon the thickness of the silicon compound layer 3, and it could become difficult to achieve an attractive appearance.

Furthermore, if the thickness of the zinc sulfide layer 4 is greater than this upper limit, the timepiece dial 1 may not be sufficiently transparent to electromagnetic waves. In addition, if the thickness of the zinc sulfide layer 4 is greater than this upper limit, appearance problems such as cracks in the zinc sulfide layer 4 and separation at the silicon compound layer 3 to zinc sulfide layer 4 interface can result when the timepiece dial 1 is subject to external stress (including heat and light).

The method of forming the silicon compound layer 3 and zinc sulfide layer 4 is not specifically limited, and various coating methods, wet plating methods, chemical vapor deposition (CVD) methods, dry plating methods (vapor phase epitaxy), and spray coating methods can be used, but a dry coating method (vapor phase epitaxy) method is preferred. Examples of coating methods include spin coating, dipping, brushing, spray coating, electrostatic coating, and electrodeposition coating. Examples of wet plating methods include electrolytic plating, immersion plating, and electroless plating. CVD methods include thermal CVD, plasma CVD, and laser CVD methods. Dry plating methods include vacuum deposition, sputtering, and ion plating.

Using a dry plating method (vapor phase epitaxy) to grow the silicon compound layer 3 and the zinc sulfide layer 4 affords a homogenous film with uniform film thickness, and reliably renders a timepiece dial 1 with particularly outstanding adhesion at the adjacent interfaces of the base layer 2, silicon compound layer 3, and zinc sulfide layer 4. The appearance and durability of the resulting timepiece dial 1 are therefore particularly good.

Furthermore, using a dry plating method (vapor phase epitaxy) to grow the silicon compound layer 3 and the zinc sulfide layer 4 minimizes variation in the film thickness even when the silicon compound layer 3 and the zinc sulfide layer 4 are relatively thin. As a result, the timepiece dial 1 can be rendered with high durability while also improving the transparency of the timepiece dial 1 to electromagnetic waves. The timepiece dial 1 is therefore particularly well suited to use in radio-controlled timepieces and solar-powered timepieces.

Using vacuum deposition for the dry plating method (vapor phase epitaxy) is a particularly effective method of achieving the foregoing effects. More specifically, manufacturing the silicon compound layer 3 and zinc sulfide layer 4 by means of vacuum deposition results even more reliably in a silicon compound layer 3 and a zinc sulfide layer 4 with uniform film thickness, homogenous quality, and outstanding adhesion at the interfaces between adjacent layers. The appearance and durability of the resulting timepiece dial 1 are therefore also particularly good.

Furthermore, using vacuum deposition to form the silicon compound layer 3 and the zinc sulfide layer 4 results in particularly small variation in film thickness even when the silicon compound layer 3 and zinc sulfide layer 4 are relatively thin. As a result, the timepiece dial 1 can be rendered with high durability while also improving the transparency of the timepiece dial 1 to electromagnetic waves. The timepiece dial 1 is therefore particularly well suited to use in radio-controlled timepieces and solar-powered timepieces.

The combined thickness of the silicon compound layer 3 and the zinc sulfide layer 4 is not specifically limited but is preferably 50 nm-250 nm, further preferably is 80 nm-220 nm, and is yet further preferably 100 nm-200 nm. If the combined thickness of the silicon compound layer 3 and zinc sulfide layer 4 is within this range, affords sufficiently high transparency to electromagnetic waves (including radio waves and light) while also affording a timepiece dial 1 with a particularly attractive appearance.

The color of the surface of the timepiece dial 1 on the side to which the silicon compound layer 3 and zinc sulfide layer 4 are disposed when defined in the L*a*b* color space defined in JIS Z 8729 is preferably a*=−10 to 10 and b*=−10 to 10, and is further preferably a*=−5 to 5 and b*=−5 to 5. This results in a timepiece dial 1 with a particularly attractive appearance.

The L* value of the color of the surface of the timepiece dial 1 on the side to which the silicon compound layer 3 and zinc sulfide layer 4 are disposed when defined in the L*a*b* color space defined in JIS Z 8729 is preferably L*=−50 to 85 and is further preferably L*=70 to 85. This results in a timepiece dial 1 with a particularly bright white appearance and a sense of higher quality.

The thickness of the timepiece dial 1 is not specifically limited but is preferably 150 μm-170 μm, is further preferably 200 μm-600 μm, and is yet further preferably 300 μm-500 μm. If the thickness of the timepiece dial 1 is within this range, increasing the thickness of the timepiece in which the timepiece dial 1 is used can be effectively prevented while assuring a timepiece dial 1 with excellent mechanical strength and shape stability.

By thus rendering the timepiece dial 1 with this silicon compound layer 3 and zinc sulfide layer 4 on the base layer 2, variation in the reflectivity of light throughout the visible spectrum (the wavelength band from 380 nm to 780 nm) can be made sufficiently low throughout the timepiece dial 1. When variation in the reflectivity of light throughout the visible spectrum is thus sufficiently low, a particularly attractive appearance with excellent whiteness and a feeling of high quality can be achieved. More specifically, these effects can be achieved if the difference A−B between the reflectivity A (%) at the wavelength where the reflectivity is highest and the reflectivity B (%) at the wavelength where the reflectivity is lowest in the visible spectrum (380 nm to 780 nm) is sufficiently small. While this difference A−B is preferably sufficiently small, difference A−B is more specifically preferably less than 25%, further preferably is less than 20%, and yet further preferably is less than 10%. This makes the foregoing effects particularly pronounced.

As described above, the timepiece dial 1 of the present invention features a beautiful appearance and outstanding transparency to electromagnetic waves. The timepiece dial 1 is therefore particularly well suited to use in radio-controlled timepieces, solar-powered timepieces (timepieces having an internal solar battery), and solar-powered radio-controlled timepieces.

This timepiece dial 1 can also be beneficially used in portable timepieces such as wristwatches because of its excellent durability.

Timepiece Dial, Second Embodiment

A second embodiment of a timepiece dial according to the present invention is described below. This description of the second embodiment focuses on the differences to the first embodiment, and further description of like parts is omitted.

Figure 2:
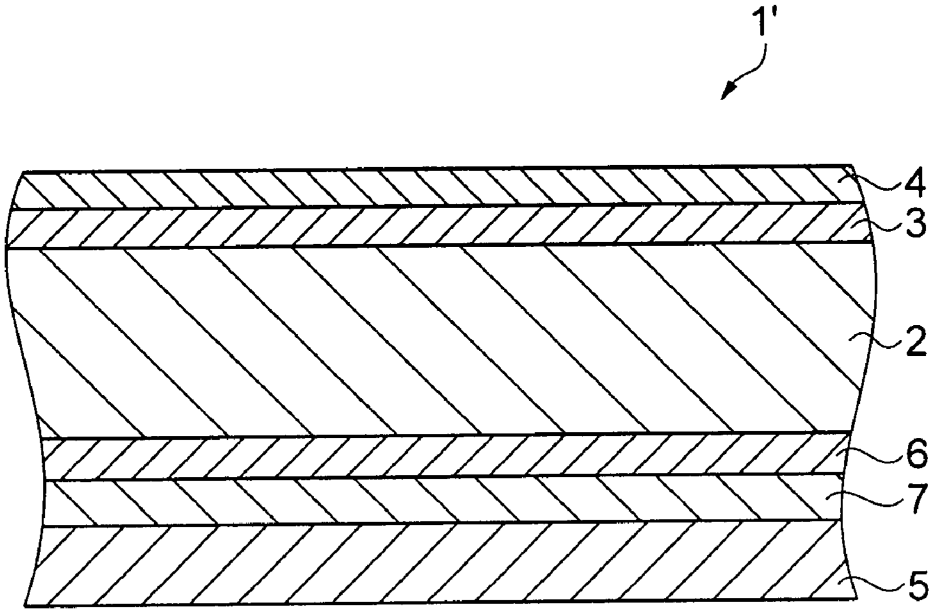
FIG. 2 is a section view of a timepiece dial according to a second embodiment of the invention.

FIG. 2 is a section view of a timepiece dial according to this second embodiment of the invention.

As shown in FIG. 2 the timepiece dial 1' according to this embodiment of the invention has a base layer 2 that is made mainly from polycarbonate, a silicon compound layer 3 that is made mainly from a silicon oxide compound, a zinc sulfide layer 4 that is made from a zinc sulfide compound and is rendered on the silicon compound layer 3 on the opposite side as the base layer 2, a polarizer 5 disposed on the base layer 2 on the opposite side as the side facing the silicon compound layer 3, and a color layer (colorizer) 6 and a diffusion layer (diffuser) 7 disposed between the polarizer 5 and the base layer 2. The timepiece dial 1' according to this embodiment of the invention is thus the same as the timepiece dial 1 according to the first embodiment of the invention other than that a color layer 6, a diffusion layer 7, and a polarizer 5 are rendered in this order on the opposite side of the base layer 2 as the surface on which the silicon compound layer 3 and zinc sulfide layer 4 are disposed. The polarizer 5, the color layer 6, and the diffusion layer 7 are described below.

Polarizer

The polarizer 5 polarizes incident light.

Providing a polarizer 5 makes it possible to assure that the timepiece dial 1' has sufficient optical transparency while also more effectively preventing being able to see through the timepiece dial 1' from the outside side of the timepiece dial 1' (the side of the timepiece dial 1' on which the silicon compound layer 3 and zinc sulfide layer 4 are disposed (the top in FIG. 2)) to the inside side of the timepiece dial 1' (the side of the timepiece dial 1' on which the polarizer 5, color layer 6, and diffusion layer 7 [silicon compound layer 3 and zinc sulfide layer 4, sic] are formed (the bottom as seen in FIG. 2)), and thus affords a timepiece dial 1' with particularly outstanding decorativeness (aesthetic appeal).

The polarizer 5 can be made from any material that can polarize incident light, but a reflective polarizer that passes a first light that oscillates in a predetermined direction and reflects a second light that oscillates in a direction perpendicular to the oscillation direction of the first light is preferred. This makes it possible to assure that the timepiece dial 1' [1, sic] has sufficient optical transparency while also more effectively preventing being able to see through the timepiece dial 1' from the outside side of the timepiece dial 1' (the side of the timepiece dial 1' on which the silicon compound layer 3 and zinc sulfide layer 4 are disposed (the top in FIG. 2)) to the inside side of the timepiece dial 1' (the side of the timepiece dial 1' on which the polarizer 5, color layer 6, and diffusion layer 7 [silicon compound layer 3 and zinc sulfide layer 4, sic] are formed (the bottom as seen in FIG. 2)), and thus affords a timepiece dial 1' with particularly outstanding decorativeness (aesthetic appearance).

The polarizer (reflective polarizer) 5 can be made from any suitable material, but is preferably made primarily from a polyester resin material in order to further enhance the effect described above.

The polarizer (reflective polarizer) 5 can alternatively be made from a plurality of film layers stacked together in order to yet further enhance the effect described above.

Figure 3:
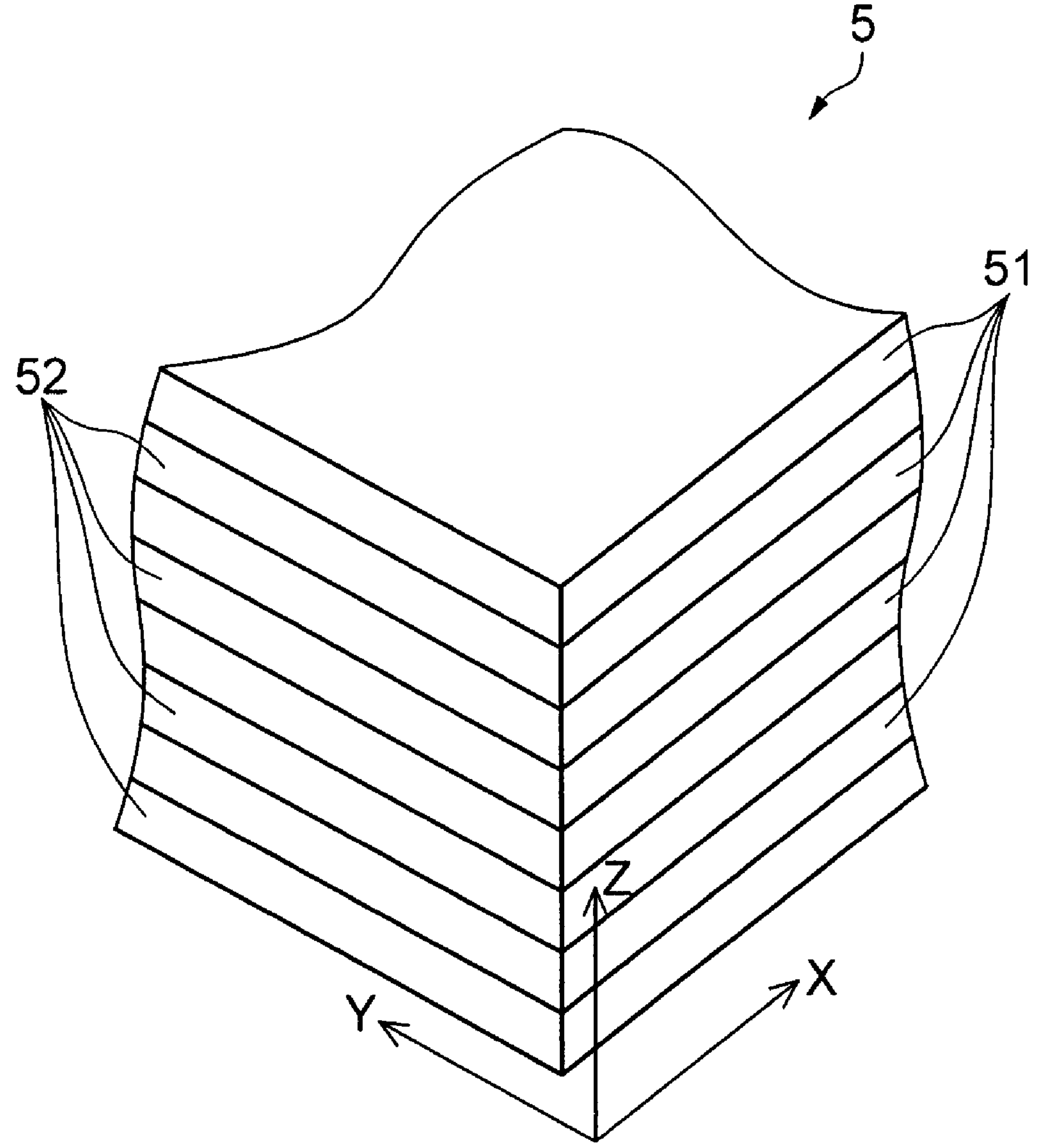
FIG. 3 is an oblique view of a preferred embodiment of a polarizer having multiple laminated layers.

FIG. 3 shows a preferred arrangement of a polarizer 5 having a plurality of layers stacked together.

As shown in FIG. 3, this multilayer polarizer 5 has two different types of polarizing films, referred to as polarizing film layers A 51 and polarizing film layers B 52, laminated together in alternating sequence. The x-axis refractive index ($n_{AX}$) of the A layers 51 and the x-axis refractive index ($n_{BX}$) of the B layers 52 are different, but the y-axis refractive index ($n_{AY}$) of the A layers 51 and the y-axis refractive index ($n_{BY}$) of the B layers 52 are effectively the same. Linear polarized light aligned with the y-axis that is incident to the polarizer 5 passes through the polarizer 5 because the refractive indices of the A layers 51 and B layers 52 are effectively equal in this direction. In addition, if $t_A$ is the average thickness of the A layers 51 and $t_B$ is the average thickness of the B layers 52 of the polarizer 5 along the z-axis, linear polarized light of wavelength λ that is aligned with the x-axis when incident to the polarizer 5 is desirably reflected by the polarizer 5.

$$t_A \times n_{AX} + t_B \times n_{BX} = \lambda/2 \quad (1)$$

Furthermore, by varying the average thickness of the A layers 51 and the B layers 52 along the z-axis, the polarizer 5 can be made to reflect x-axis linear polarized light incident to the polarizer 5 over a wide range of the visible spectrum.

The polarizer 5 thus rendered therefore passes part and reflects part of the light incident to the timepiece dial 1' while more effectively preventing being able to see through the timepiece dial 1' from the outside side of the timepiece dial 1' (the side of the timepiece dial 1' on which the silicon compound layer 3 and zinc sulfide layer 4 are disposed (the top in the figure)) to the inside side of the timepiece dial 1' (the side of the timepiece dial 1' on which the polarizer 5, color layer 6, and diffusion layer 7 [silicon compound layer 3 and zinc sulfide layer 4, sic] are formed (the bottom as seen in the figure)).

When the polarizer 5 is thus rendered as a laminated construction, the layers (A layers 51 and B layers 52) can be made from any suitable materials, but the A layers 51 of the polarizer 5 are preferably made of polyethylene naphthalate (and yet further preferably an extruded film of polyethylene naphthalate), and the B layers 52 are preferably made of a copolyester of naphthalene dicarboxylic acid and terephthalic acid. This makes it possible to assure that the timepiece dial 1' has sufficient optical transparency while also more effectively preventing being able to see through the timepiece dial 1' from the outside side of the timepiece dial 1' (the side of the timepiece dial 1' on which the silicon compound layer 3 and zinc sulfide layer 4 are disposed (the top in the figure)) to the inside side of the timepiece dial 1' (the side of the timepiece dial 1' on which the polarizer 5, color layer 6, and diffusion layer 7 [silicon compound layer 3 and zinc sulfide layer 4, sic] are formed (the bottom as seen in the figure)), and thus affords a timepiece dial 1' with particularly outstanding decorativeness (aesthetic appearance).

The polarizer 5 is not limited to the foregoing materials and any materials suitable to rendering the polarization films (polarizers) described above can be used.

When the polarizer 5 is rendered using laminated films as described above, the number of laminated layers is not specifically limited but preferably ranges from 2 to 20, further preferably ranges from 6 to 12 layers, and yet further preferably includes 8 to 10 layers. This renders the polarizer 5 even more effective.

The thickness of the polarizer 5 is also not specifically limited, but is preferably 20 μm to 300 μm and is yet further preferably 100 μm to 200 μm. If the thickness of the polarizer 5 is within this range, the polarizer 5 is even more effective.

Color Layer

The color layer 6 is made from a material containing a coloring agent. Light (outside light) incident form the base layer 2 side is thus incident to the polarizer 5 while a part of the incident light becomes light with the color of the coloring agent and is reflected back to the base layer 2. Light that is incident from the polarizer 5 side also becomes light colored by the coloring agent and is emitted to the base layer 2. As a result, light (outside light) that is incident from the base layer 2 side can be passed to the polarizer 5 side (the side on which the solar battery 94 is disposed to the wristwatch 100 described further below) while imparting color to the timepiece dial 1' and more effectively preventing being able to see from the outside side of the timepiece dial 1' (the side on which the silicon compound layer 3 and zinc sulfide layer 4 are disposed to the timepiece dial 1' (the top in the figures)) through the timepiece dial 1' to the inside side of the timepiece dial 1' (the side on which the polarizer 5 is disposed to the timepiece dial 1' (the bottom in the figures)). This affords a timepiece dial 1' with particularly outstanding decorativeness (aesthetic appeal). More particularly, the timepiece dial 1' having this silicon compound layer 3, zinc sulfide layer 4, and color layer 6 can be advantageously used as the timepiece dial in a radio-controlled timepiece or solar timepiece (a timepiece having a solar cell) that is particularly decorative (has visual appeal) by combining the color imparted by the color layer 6 with the luster imparted by the silicon compound layer 3 and the zinc sulfide layer 4 while maintaining sufficiently high transparency to electromagnetic waves.

In addition, timepiece dials 1' having this color layer 6 can be manufactured in colors that cannot be achieved using only the silicon compound layer 3 and zinc sulfide layer 4. The color of the timepiece dial can also be controlled by changing the materials used in the color layer, and this can be effectively used for small lot production of many different timepiece dials.

The coloring agent can be a pigment or a dye, for example.

The color layer 6 is preferably made from a sticky, adhesive material in order to improve adhesion between the base layer 2 and the polarizer 5, thereby improve the durability (including impact resistance) of the timepiece dial 1', and thus afford a timepiece dial 1' that is highly dependable as both a practical and a decorative product.

Examples of materials that are both sticky and adhesive (sticky, adhesive materials) include materials that are used in mastics and adhesives, but more specific examples of sticky, adhesive materials include urethane resins and acrylic resins, and urethane resins are particularly preferred. Such materials afford particularly good adhesion between the base layer 2 and the polarizer 5 while retaining the optical transparency and attractive appearance of the timepiece dial 1'.

When the color layer 6 is composed of a sticky, adhesive material as described above, the color layer 6 is preferably made mainly from the sticky, adhesive material. This affords particularly good adhesion between the base layer 2 and the polarizer 5.

The thickness of the color layer 6 is not particularly limited but is preferably 1-25 μm and is further preferably 5-15 μm. If the thickness of the color layer 6 is within this range, light can be more desirably reflected and refracted at the interface between the color layer 6 and the base layer 2 and the interface between the color layer 6 and the polarizer 5, thus affording a particularly decorative (attractive) timepiece dial 1'.

A coloring agent can be included in the base layer 2 to achieve the same color effect as this timepiece dial 1' having a color layer 6, but mixing a coloring agent with the base layer 2 can adversely affect adhesion between the base layer and the silicon compound layer. Achieving sufficient transparency to electromagnetic waves for the base layer 2 may also not be possible, and the attractive appearance produced in the timepiece dial 1' by the reflection and refraction of incident light at the interfaces between the base layer 2 and the adjacent layers may be impaired. By introducing a separate color layer, however, this embodiment of the invention simply and reliably assures an attractive appearance in the timepiece dial 1'.

Diffusion Layer

The diffusion layer 7 is made from a material containing a diffusing agent having the ability to diffuse incident light. Light (outside light) that is incident to the base layer 2 side of the diffusion layer 7 is thus passed to the polarizer 5 side while the diffusion layer 7 diffuses part of the incident light to the base layer 2 side. The diffusion layer 7 also emits while diffusing light that is incident from the polarizer 5 side to the base layer 2 side. As a result, light (outside light) that is incident from the base layer 2 is thus emitted to the polarizer 5 (the side on which the solar battery 94 is disposed in a wristwatch 100 as further described below) while more effectively preventing being able to see from the outside side of the timepiece dial 1' (the side on which the silicon compound layer 3 and zinc sulfide layer 4 are disposed to the timepiece dial 1' (the top in the figures)) through the timepiece dial 1' to the inside side of the timepiece dial 1' (the side on which the polarizer 5 is disposed to the timepiece dial 1' (the bottom in the figures)). More particularly, by using a diffusion layer 7 to emit (diffuse) light to the base layer 2 side of the timepiece dial 1', the appearance of the timepiece dial 1' can be given a higher degree of whiteness (luster) affording a particularly luxurious appearance.

The diffusing material used for the diffusion layer 7 can be any material with the ability to diffuse light.

The diffusing agent can be amorphous or have any desired shape, including granular (powder), squamous, or acicular. The diffusion layer 7 can be rendered using effectively only the diffusion agent.

Materials that can be used for the diffusion agent include, for example, silica, glass, and plastic.

The diffusion layer 7 is preferably made from a sticky, adhesive material in order to improve adhesion between the base layer 2 and the polarizer 5, thereby improve the durability (including impact resistance) of the timepiece dial 1', and thus afford a timepiece dial 1' that is highly dependable as both a practical and a decorative product.

Examples of materials that are both sticky and adhesive (sticky, adhesive materials) include materials that are used in mastics and adhesives, but more specific examples of sticky, adhesive materials include urethane resins and acrylic resins, and urethane resins are particularly preferred. Such materials afford particularly good adhesion between the base layer 2 and the polarizer 5 while retaining the optical transparency and attractive appearance of the timepiece dial 1'.

When the diffusion layer 7 is composed of a sticky, adhesive material as described above, the diffusion layer 7 is preferably made mainly from the sticky, adhesive material. This affords a particularly effective diffusion layer 7.

The thickness of the diffusion layer 7 is not particularly limited but is preferably 10-30 μm and is further preferably 15-25 μm. Rendering the thickness of the diffusion layer 7 within this range makes the diffusion layer 7 particularly effective.

The timepiece dial 1' according to this second embodiment described above has the silicon compound layer 3 and zinc sulfide layer 4 disposed to one side of the base layer 2 and the color layer 6, diffusion layer 7, and polarizer 5 layered in this sequence on the opposite side of the base layer 2, but the order of the color layer 6 and diffusion layer 7 can be reversed. Further alternatively, a layer combining the coloring agent and diffusion agent in one layer can be used instead of the color layer 6 and the diffusion layer 7. Any of these arrangements affords a timepiece dial with the advantages described above.

As described above, the timepiece dial 1' according to this embodiment of the invention has a polarizer 5, a color layer 6, and a diffusion layer 7 in addition to the base layer 2, silicon compound layer 3, and zinc sulfide layer 4. As a result, a timepiece dial 1' with excellent mechanical strength and shape stability can be rendered even using a relatively thin base layer 2 on the order of 150 μm-170 μm thick.

The thickness of the timepiece dial 1' is not particularly limited but is preferably 150 μm-700 μm, is further preferably 200 μm-600 μm, and is yet further preferably 300 μm-500 μm. If the thickness of the timepiece dial 1' is within this range, the timepiece in which the timepiece dial 1' is used can be effectively prevented from becoming too thick while assuring a timepiece dial 1' with excellent mechanical strength and shape stability.

As described above, the timepiece dial 1' according to this embodiment of the invention has an excellent appearance and outstanding transparency to electromagnetic waves. The timepiece dial 1' can therefore be beneficially used in a radio-controlled timepiece, a solar timepiece (a timepiece having an internal solar cell), or a solar-powered radio-controlled timepiece.

This timepiece dial 1 can also be beneficially used in portable timepieces such as wristwatches because of its excellent durability.

Timepiece

A timepiece according to the present invention having the timepiece dial according to the present invention as described above is described next.

A timepiece according to the present invention has the timepiece dial of the invention described above. The timepiece dial of the invention provides excellent optical transparency (electromagnetic wave transparency) and decorativeness (attractive appearance). The timepiece of the invention incorporating the timepiece dial of the invention is thus well-suited to use as a solar-powered timepiece or a radio-controlled timepiece. Other than the timepiece dial used to render a timepiece according to the invention (that is, the timepiece dial according to the invention), parts known from the literature are used to render the timepiece and the arrangement of the timepiece of the invention is described below by way of example only.

Figure 4:
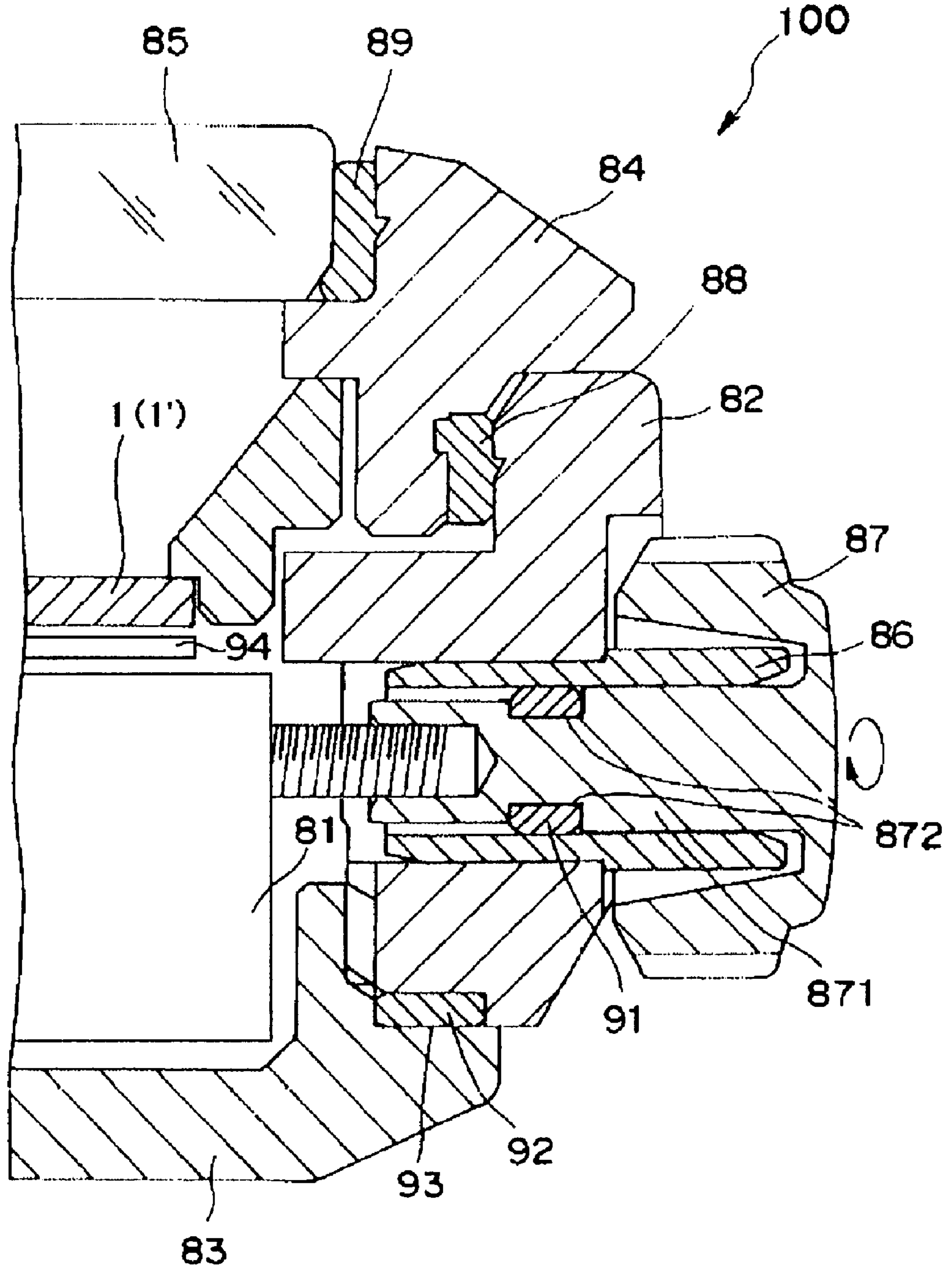
FIG. 4 is a partial section view of a timepiece (portable timepiece) according to a preferred embodiment of the invention.

FIG. 4 is a section view of a preferred embodiment of a timepiece according to the present invention using a wristwatch by way of example.

As shown in FIG. 4 the wristwatch (portable timepiece) 100 according to this embodiment of the invention has a case 82, a back cover 83, a bezel 84, and a crystal 85. The timepiece dial 1 [1', sic] (or timepiece dial 1') of the invention described above, a solar battery 94, movement 81, and hands not shown are housed inside the case 82.

The crystal 85 is typically made from high transparency glass or sapphire, for example. This assures the maximum benefit of the aesthetics of the timepiece dial 1 (or timepiece dial 1') of the invention while also assuring that sufficient light is incident to the solar battery 94.

The movement 81 drives the hands using power produced by the solar battery 94.

Although not shown in FIG. 4, the movement 81 includes a lithium ion secondary cell or electric double layer capacitor for storing the electromotive force of the solar battery 94, a quartz oscillator as a reference time source, a IC device for outputting the drive pulses for driving the timepiece based on the oscillation frequency of the quartz oscillator, a stepping motor for driving the hands every second based on the applied drive pulses, and a wheel train for transferring movement of the stepping motor to the hands.

The movement 81 also has an antenna not shown for radio signal reception. The movement 81 also has a function for adjusting the time based on a received signal.

The solar battery 94 has a function for converting light energy to electrical energy. The electrical energy output by the solar battery 94 is then used to drive the movement.

The solar battery 94 is rendered, for example, with a p-i-n structure having p-type impurities and n-type impurities selectively introduced to multijunction amorphous silicon thin films and a multijunction amorphous silicon thin film with a low impurity concentration (the intrinsic or i-layer) between the p-layer amorphous silicon thin film and the n-layer amorphous silicon thin film.

The stem pipe 86 is pressed into and fixed to the case 82, and the stem 871 of the crown 87 is inserted to rotate freely inside the stem pipe 86.

The case 82 and bezel 84 are joined with plastic packing 88, and the bezel 84 and the crystal 85 are fixed with plastic packing 89.

The back cover 83 is fit (or screwed) into the case 82, and a circular rubber packing (back cover packing) 92 is fit compressed into the joint (sealing portion) 93 between the case 82 and back cover 83. The sealing portion 93 thus seals the case against liquids and affords water resistance.

A channel 872 is formed around the middle of the outside of the stem 871 of the crown 87, and the circular rubber packing (crown packing) 91 is fit into this channel 872. This rubber crown packing 91 is tight to the inside wall of the stem pipe 86 and is compressed between this inside wall and the inside surface of the channel 872. The gap between the crown 87 and stem pipe 86 is thus sealed against liquids and water resistance is achieved. When the crown 87 is turned the rubber crown packing 91 turns with the stem 871 and slides circumferentially against the inside wall of the stem pipe 86.

A portable timepiece (wristwatch) of this type requires particularly outstanding durability (such as impact resistance) for a timepiece, and can use the present invention to particular advantage to achieve a very attractive appearance with outstanding durability.

A wristwatch (portable timepiece) is used by way of example as a solar-powered radio-controlled timepiece to describe a preferred embodiment of the invention, but the invention can be used with portable timepieces other than wristwatches, mantle clocks, wall clocks, and other kinds of timepieces. The invention can also be used with solar timepieces other than solar-powered radio-controlled timepieces, radio-controlled timepieces other than solar-powered radio-controlled timepieces, and can be used with any type of timepiece.

The invention has been described with reference to preferred embodiments of the invention but is obviously not limited to these embodiments.

The arrangement of the timepiece dial and timepiece according to the present invention can be replaced by a different arrangement achieving the same function, for example, or by arrangements adding other functions not described herein. Printed portions rendered by various printing methods can be included, for example.

The second embodiment above is described with a color layer and a diffusion layer between the base layer and polarizer, but the color layer and diffusion layer can be omitted. More specifically, the base layer and polarizer can be adjacent, or intermediate layers other than the color layer and diffusion layer can be disposed between the base layer and polarizer.

It is also sufficient to render at least one layer (coating) on the surface of the timepiece dial (the surface of the base layer 2 (the opposite side as the side on which the silicon compound layer 3 and zinc sulfide layer 4 are disposed), the surface of the polarizer 5 (the opposite side as the side facing the silicon compound layer 3 and the zinc sulfide layer 4), or the surface of the silicon compound layer 3 and zinc sulfide layer 4 (the opposite side as the side facing the base layer 2)). This layer can also be removed when the timepiece dial is used.

SPECIFIC EXAMPLES

Specific examples of preferred embodiments of the present invention are described below.

1. Manufacturing the Timepiece Dial

Example 1

A timepiece dial according to the present invention can be manufactured as described below.

A base member having the desired shape of the timepiece dial is produced by compression molding polycarbonate and then grinding and polishing as needed. The resulting base layer is substantially circular and is approximately 27 mm in diameter and approximately 500 μm thick.

The base member is then washed. The base member can be washed by ultrasonic cleaning in a neutral detergent for 10 minutes followed by a water wash for 10 seconds and a demineralized water wash for 10 seconds.

The silicon compound layer and zinc sulfide layer are then sequentially rendered on the surface of the cleaned base to form the timepiece dial. The silicon compound layer and zinc sulfide layer are produced using a plurality of thin film materials containing metal compounds as the vapor source, heating the vapor source in a high vacuum chamber, and depositing the thin film materials from the vapor source on the base.

The washed base member is then installed in a vacuum deposition chamber, and the vacuum deposition chamber is then vented to a vacuum of $1.3\times10^{-4}$ Pa. A laser is then emitted to a thin film of at least 99% pure $SiO_2$ as the vapor source for a processing time of 2 minutes to form a silicon compound layer of at least 99 wt % $SiO_2$. The thickness of the resulting silicon compound layer was 100 nm.

While holding the vacuum deposition chamber at a vacuum of $1.3\times10^{-4}$ Pa, a laser is then emitted to a thin film of at least 99% pure ZnS as the vapor source for a processing time of 1 minute to form a zinc sulfide layer of at least 99 wt % ZnS over the surface of the silicon compound layer. The thickness of the resulting zinc sulfide layer was 20 nm.

The combined thickness of the resulting silicon compound layer and zinc sulfide layer was thus 120 nm.

The thickness of the silicon compound layer, the thickness of the zinc sulfide layer, and the combined thickness of the silicon compound layer and zinc sulfide layer were measured using the microscopic cross section examination method described in JIS H 5821.

Example 2

The timepiece dial in this example was manufactured in the same way as the timepiece dial in the first example except that the processing time in the vacuum deposition chamber during the steps forming the silicon compound layer and zinc sulfide layer was adjusted as shown in Table 1 in order to change the thickness of each layer.

Example 3

A base member having the desired shape of the timepiece dial is produced by compression molding polycarbonate and then grinding and polishing as needed. The resulting base layer is substantially circular and is approximately 27 mm in diameter and approximately 300 μm thick.

The base member is then washed. The base member can be washed by ultrasonic cleaning in a neutral detergent for 10 minutes followed by a water wash for 10 seconds and a demineralized water wash for 10 seconds.

The silicon compound layer and zinc sulfide layer are then sequentially rendered on the surface of the cleaned base to form the timepiece dial. The silicon compound layer and zinc sulfide layer are produced using a plurality of thin film materials containing metal compounds as the vapor source, heating the vapor source in a high vacuum chamber, and depositing the thin film materials from the vapor source on the base.

The washed base member is first installed in a vacuum deposition chamber, and the vacuum deposition chamber is then heated while being vented to a vacuum of $1.3\times10^{-4}$ Pa. A laser is then emitted to a thin film of at least 99% pure $SiO_2$ as the vapor source for a processing time of 2 minutes to form a silicon compound layer of at least 99 wt % $SiO_2$. The thickness of the resulting silicon compound layer was 100 nm.

While holding the vacuum deposition chamber at a vacuum of $1.3\times10^{-4}$ Pa, a laser is then emitted to a thin film of at least 99% pure ZnS as the vapor source for a processing time of 1 minute to form a zinc sulfide layer of at least 99 wt % ZnS over the surface of the silicon compound layer. The thickness of the resulting zinc sulfide layer was 20 nm.

The combined thickness of the resulting silicon compound layer and zinc sulfide layer was thus 120 nm.

A polarizer (reflective polarizer) is then bonded by means of an intervening color layer compound composed of a coloring agent and a urethane adhesive (a urethane resin) to the opposite side of the base layer as the side on which the silicon compound layer and zinc sulfide layer are formed. This results in a timepiece dial having a zinc sulfide layer, a silicon compound layer, the base layer, a color layer, and a polarizer laminated together in sequence. The polarizer was rendered by alternately laminating eight layers of sheets of polyethylene naphthalate extruded for alignment with one axis with sheets of a copolyester of naphthalene dicarboxylic acid and terephthalic acid oriented with one axis. The thickness of this polarizer was 160 μm. A urethane coating was used as the coloring agent. The thickness of the color layer was 10 μm.

Example 4

The timepiece dial in this example was manufactured in the same way as the timepiece dial in the third example except that the processing time in the vacuum deposition chamber during the steps forming the silicon compound layer and zinc sulfide layer was adjusted as shown in Table 1 in order to change the thickness of each layer.

Example 5

The timepiece dial in this example was manufactured in the same way as the timepiece dial in the third example except that a diffusion layer made of a diffusion agent and a urethane adhesive (a urethane resin) was rendered instead of a color layer. Silica powder was used as the diffusion agent. The diffusion layer thickness was 20 μm.

Example 6

The timepiece dial in this example was manufactured in the same way as the timepiece dial in the third example except that a diffusion layer made of a diffusion agent and a urethane adhesive (a urethane resin) was rendered between the color layer and the polarizer. This resulted in a timepiece dial having a zinc sulfide layer, silicon compound layer, [silicon compound layer, a zinc sulfide layer, sic] the base layer, a color layer, a diffusion layer, and a polarizer laminated together in this order.

Silica powder was used as the diffusion agent. The diffusion layer thickness was 20 μm.

Examples 7 to 9

The timepiece dials in these example were manufactured in the same way as the timepiece dial in the sixth example except that the processing time in the vacuum deposition chamber during the steps forming the silicon compound layer and zinc sulfide layer was adjusted as shown in Table 1 in order to change the thickness of each layer.

Comparison Sample 1

The timepiece dial in this comparison was manufactured in the same way as the timepiece dial of the first example except that the silicon compound layer was not formed after rendering the zinc sulfide layer directly on the surface of the base layer to the thickness shown in Table 1. More specifically, other than forming only a zinc sulfide layer on the surface of the base layer to the thickness shown in Table 1, the timepiece dial was rendered in the same way as the timepiece dial in the first example above.

Comparison Sample 2

The timepiece dial in this example was manufactured in the same way as the timepiece dial in the first comparison except that the processing time in the vacuum deposition chamber during the step forming the zinc sulfide layer was adjusted as shown in Table 1 in order to change the thickness of the zinc sulfide layer.

Comparison Sample 3

The timepiece dial in this comparison was manufactured in the same way as the timepiece dial of the first example except that the zinc sulfide layer was not formed after rendering the silicon compound layer on the surface of the base layer. More specifically, other than forming only a silicon compound layer on the surface of the base layer, the timepiece dial was rendered in the same way as the timepiece dial in the first example above.

Comparison Sample 4

The timepiece dial in this example was manufactured in the same way as the timepiece dial in the third comparison except that the processing time in the vacuum deposition chamber during the step forming the silicon compound layer was adjusted as shown in Table 1 in order to change the thickness of the silicon compound layer.

Comparison Sample 5

The timepiece dial in this example was manufactured in the same way as the timepiece dial in the sixth example except that the color layer, the diffusion layer, and the polarizer were formed on the base without first forming a metallic compound layer. More specifically, the timepiece dial in this comparison is a laminate having a base layer, a color layer, a diffusion layer, and a polarizer.

Comparison Sample 6

The sequence in which the silicon compound layer and the zinc sulfide layer were formed was reversed in this comparison. The resulting timepiece dial thus had a silicon compound layer, a zinc sulfide layer, the base layer, a color layer, a diffusion layer, and a polarizer in this order.

Comparison Sample 7

This timepiece dial manufactured for this comparison was identical to the timepiece dial in the sixth example except that a magnesium fluoride layer of at least 99% $MgF_2$ was formed on the surface of the base layer by vacuum deposition using at least 99% pure $MgF_2$ as the vapor source.

Comparison Sample 8

This timepiece dial manufactured for this comparison was identical to the timepiece dial in the sixth example except that a trititanium pentoxide layer of at least 99% $Ti_3O_5$ was formed on the surface of the base layer by vacuum deposition using at least 99% pure $Ti_3O_5$ as the vapor source.

Comparison Sample 9

This timepiece dial manufactured for this comparison was identical to the timepiece dial in the sixth example except that a magnesium fluoride layer and then a trititanium pentoxide layer were formed in this order on the surface of the base layer by vacuum deposition.

Comparison Sample 10

The timepiece dial manufactured in this comparison was identical to the timepiece dial in the eighth example except that acrylonitrile-butadiene-styrene copolymer (ABS resin) was used instead of polycarbonate for the base. The thickness of the base layer made of ABS copolymer was approximately 500 μm.

The arrangements of the various examples and comparison samples described above are summarized in Table 1. Note that PC denotes polycarbonate and ABS denotes ABS resin in Table 1. The refractive indices of the metallic compound layers in the examples and comparison samples described above were as follow: the refractive index of the zinc sulfide layer (ZnS) was 2.30; the refractive index of the silicon compound layer ($SiO_2$) was 1.46; the refractive index of the magnesium fluoride layer ($MgF_2$) was 1.38; and the refractive index of the trititanium pentoxide layer ($Ti_3O_5$) was 2.25.

VG (excellent): a* from −5 to 5 and b* from −5 to 5 in the L*a*b* color space defined in JIS Z 8729

G (good): a* from −10 to 10 and b* from −10 to 10 (outside the + (excellent appearance) range) in the L*a*b* color space defined in JIS Z 8729

OK (some visual defects): a* from −15 to 15 and b* from −15 to 15 (outside the + (excellent) and G (good) ranges) in the L*a*b* color space defined in JIS Z 8729 x (unacceptable): outside the range of a* from −15 to 15 and b* from −15 to 15 in the L*a*b* color space defined in JIS Z 8729

The light source of the spectrophotometer was the $D_{65}$ light source specified in JIS Z 8720. A 2° view angle was used.

The L* value in the L*a*b* color space defined in JIS Z 8729 was also measured and ranked in the following four levels.

VG (very good): 70<=L*<=85 in the L*a*b* color space defined in JIS Z 8729

TABLE 1

| | Base | | | Metal compound layer (complete) | | | | Color layer | Diffusion layer | Polarizer |
|---|---|---|---|---|---|---|---|---|---|---|
| | | | | | Each layer | | | | | |
| | Material | Thickness (μm) | Refractive index | Material (from base) | Thickness (nm) (from base) | Refractive index (from base) | Thickness (nm) | Thickness (μm) | Thickness (μm) | Thickness (μm) |
| Example 1 | PC | 500 | 1.58 | $SiO_2$/ZnS | 100/20 | 1.46/2.30 | 120 | | | |
| Example 2 | PC | 500 | 1.58 | $SiO_2$/ZnS | 50/80 | 1.46/2.30 | 130 | | | |
| Example 3 | PC | 300 | 1.58 | $SiO_2$/ZnS | 100/20 | 1.46/2.30 | 120 | 10 | | 160 |
| Example 4 | PC | 300 | 1.58 | $SiO_2$/ZnS | 120/50 | 1.46/2.30 | 170 | 10 | | 160 |
| Example 5 | PC | 300 | 1.58 | $SiO_2$/ZnS | 100/20 | 1.46/2.30 | 120 | | 20 | 160 |
| Example 6 | PC | 300 | 1.58 | $SiO_2$/ZnS | 100/20 | 1.46/2.30 | 120 | 10 | 20 | 160 |
| Example 7 | PC | 300 | 1.58 | $SiO_2$/ZnS | 120/80 | 1.46/2.30 | 200 | 10 | 20 | 160 |
| Example 8 | PC | 300 | 1.58 | $SiO_2$/ZnS | 120/50 | 1.46/2.30 | 170 | 10 | 20 | 160 |
| Example 9 | PC | 300 | 1.58 | $SiO_2$/ZnS | 50/10 | 1.46/2.30 | 60 | 10 | 20 | 160 |
| Comparison 1 | PC | 500 | 1.58 | ZnS | 100 | 2.30 | 100 | | | |
| Comparison 2 | PC | 500 | 1.58 | ZnS | 150 | 2.30 | 150 | | | |
| Comparison 3 | PC | 500 | 1.58 | $SiO_2$ | 100 | 1.46 | 100 | | | |
| Comparison 4 | PC | 500 | 1.58 | $SiO_2$ | 50 | 1.46 | 50 | | | |
| Comparison 5 | PC | 500 | 1.58 | | | | | 10 | 20 | 160 |
| Comparison 6 | PC | 500 | 1.58 | ZnS/$SiO_2$ | 20/100 | 2.30/1.46 | 120 | 10 | 20 | 160 |
| Comparison 7 | PC | 500 | 1.58 | $MgF_2$ | 100 | 1.38 | 100 | 10 | 20 | 160 |
| Comparison 8 | PC | 500 | 1.58 | $Ti_3O_5$ | 70 | 2.25 | 70 | 10 | 20 | 160 |
| Comparison 9 | PC | 500 | 1.58 | $MgF_2$/$Ti_3O_5$ | 100/20 | 1.38/2.25 | 120 | 10 | 20 | 160 |
| Comparison 10 | ABS | 500 | 1.52 | $SiO_2$/ZnS | 120/50 | 1.46/2.30 | 170 | 10 | 20 | 160 |

2. Visual Evaluation of Appearance

The timepiece dials manufactured in each of the examples and comparison samples described above were visually inspected from the side on which the metallic compound layers were formed and the appearance of each timepiece dial was ranked according to the following six levels.

VVG: particularly outstanding appearance

VG: very good appearance

G: good appearance

OK: acceptable appearance x: unacceptable appearance xx: particularly poor appearance

3. Evaluation of Appearance Using a Colorimeter

The color (a*b* values) of the timepiece dials manufactured in each of the examples and comparison samples described above was measured using a spectrophotometer (Minolta CM-2022) and ranked according to the following four levels.

G (good): 50<=L*<=70 in the L*a*b* color space defined in JIS Z 8729

OK (some visual defects): 40<=L*<=50 in the L*a*b* color space defined in JIS Z 8729 x (unacceptable): L*<40 in the L*a*b* color space defined in JIS Z 8729

4. Variation in Reflectivity in the Visible Spectrum

Reflectivity at different wavelengths in the visible spectrum (380-780 nm) was measured at the side on which the metallic compound layer was formed for each of the timepiece dials manufactured as described in the foregoing examples and comparison samples. Based on the results, the difference A−B between the reflectivity A (%) at the wavelength where the reflectivity is highest and the reflectivity B (%) at the wavelength where the reflectivity is lowest in the visible spectrum (380 nm to 780 nm) was determined and ranked according to the following five levels. Variation in reflectivity in the visible spectrum decreases as the difference A−B decreases. Reflectivity was measured with a solar battery disposed on the back side of the timepiece dial.

VVG (excellent): (A−B)<10%

VG (very good): 10%<=(A−B)<20%

G (good): 20%<=(A−B)<25%

OK (marginal): 25%<=(A−B)<30% x (no good): (A−B)>=30%

5. Optical Transparency of the Timepiece Dial

Optical transparency was measured using the following method for each timepiece dial manufactured in the examples and comparison samples described above.

The solar battery and timepiece dials were first placed in a darkroom. The light-receiving side of just the solar battery was then exposed to light from a fluorescent light (light source) located a specific distance away. The output current from the solar battery at this time is denoted output current A (mA). The timepiece dial was then placed over the light-receiving side of the solar battery, and again exposed to light from a fluorescent light (light source) located a specific distance away. The output current from the solar battery at this time is denoted output current B (mA). The optical transmittance of the timepiece dial was calculated as (B/A)×100, and ranked in the four levels shown below. The transparency of the timepiece dial increases as optical transmittance rises. The timepiece dial was placed on the solar battery so that the side of the base layer on which the metallic compound layer was formed was facing the fluorescent light (light source).

VG (very good): >25%

G (good): greater than or equal to 20% and <25%

OK: greater than or equal to 15% and <25% x (no good): <15%

Wristwatches as shown in FIG. 4 were then manufactured using the timepiece dials manufactured as described in the above examples and comparison samples. The resulting wristwatches were then placed in a darkroom. The dial side (crystal side) of each wristwatch was then exposed to light from a fluorescent light (light source) located a specific distance away. The intensity of the light was changed at a constant rate so that the light intensity gradually increased. The movement operated in all timepieces according to the present invention and all timepieces described in the comparison samples even when light intensity was relatively low.

6. Radio Frequency Transparency

The radio frequency transparency of each of the timepiece dials manufactured as described in the foregoing examples and comparison samples was evaluated using the method described below.

A timepiece case and an internal module for a wristwatch (movement) having an antenna for RF reception were first prepared.

The internal wristwatch module (movement) and a timepiece dial were assembled in the timepiece case, and the assembled timepiece was used to measure RF reception sensitivity.

Based on the reception sensitivity when the timepiece dial is not present, the drop in reception sensitivity (dB) when the timepiece dial was installed was measured and ranked according to the following four levels. The radio frequency transparency of the timepiece dial increases as the drop in RF reception sensitivity decreases. The timepiece dial was installed so that the side of the base layer on which the metallic compound layer was formed was facing the fluorescent light (light source).

VG (very good): no measurable drop in sensitivity (below detection limit)

G (good): sensitivity drop<0.7 dB

OK: sensitivity drop>=0.7 dB and <1.0 dB x (no good): sensitivity drop>=1.0 dB

7. Metal Compound Layer Adhesion

The following two tests were used to measure the adhesion of the metal compound layer in each of the timepiece dials manufactured as described in the foregoing examples and comparison samples.

7-1 Bending Test

Each timepiece dial was visually inspected after bending each timepiece dial 30° at the center of the timepiece dial over a 4 mm diameter steel rod, and the appearance of each timepiece dial was ranked according to the following four levels. Each timepiece dial was bent in both compression and extension directions.

VG (very good): no separation or exfoliation of metal compound layer observed

G (good): substantially no separation of metal compound layer observed

OK: clear separation of metal compound layer observed x (no good): cracking, separation of metal compound layer observed 7-2 Heat Cycle Test The timepiece dials were also subjected to a heat cycle test as described below.

The timepiece dial was first placed for 1.5 hours in a 200° C. environment, then in a 600° C. environment for 2 hours, then in a 200° C. environment for 1.5 hours, then in a −20° C. environment for 3 hours. The temperature was then returned to 20° C., completing one cycle (8 hours). This cycle was repeated three times (for a total 24 hours).

Each timepiece dial was then visually inspected and the appearance of each timepiece dial was ranked according to the following four levels.

VG (very good): no separation or exfoliation of metal compound layer observed

G (good): substantially no separation of metal compound layer observed

OK: clear separation of metal compound layer observed x (no good): cracking, separation of metal compound layer observed The results of these tests and evaluations are summarized in Table 2.

TABLE 2

| | Appearance | | | Variation | | | Adhesion | |
|---|---|---|---|---|---|---|---|---|
| | | Spectrophotometer | | in | Optical | RF | | Heat |
| | Visual | a*b* | L* | reflectivity | transparency | transparency | Bending test | cycle test |
| Example 1 | VG | VG | G | VVG | VG | VG | VG | VG |
| Example 2 | G | VG | G | VVG | VG | VG | G | G |
| Example 3 | VVG | VG | VG | VVG | VG | VG | VG | VG |
| Example 4 | VVG | VG | VG | VG | VG | VG | VG | VG |

TABLE 2-continued

| | Appearance | | | Variation | | | Adhesion | |
|---|---|---|---|---|---|---|---|---|
| | | Spectrophotometer | | in | Optical | RF | | Heat |
| | Visual | a*b* | L* | reflectivity | transparency | transparency | Bending test | cycle test |
| Example 5 | VVG | VG | VG | VG | VG | VG | VG | VG |
| Example 6 | VVG | VG | VG | VVG | VG | VG | VG | VG |
| Example 7 | VG | VG | VG | G | VG | VG | G | G |
| Example 8 | VVG | VG | VG | VG | VG | VG | VG | VG |
| Example 9 | G | G | G | VVG | VG | VG | VG | VG |
| Comparison 1 | G | G | G | VVG | VG | VG | X | X |
| Comparison 2 | G | G | G | VVG | VG | VG | X | X |
| Comparison 3 | X | X | X | VG | VG | VG | VG | G |
| Comparison 4 | X | X | X | VG | VG | VG | G | G |
| Comparison 5 | XX | VG | X | VVG | VG | VG | — | — |
| Comparison 6 | OK | OK | OK | G | VG | VG | VG | VG |
| Comparison 7 | X | X | X | OK | VG | VG | G | G |
| Comparison 8 | OK | G | G | VG | VG | VG | X | X |
| Comparison 9 | X | OK | OK | X | VG | VG | G | G |
| Comparison 10 | G | G | G | VG | VG | VG | X | OK |

As will be known from Table 2, the timepiece dial of the present invention offers an excellent appearance and outstanding transparency to electromagnetic waves (light and RF signals). The metal compound layer of the invention rendered by forming a zinc sulfide layer (ZnS) and then a silicon compound layer ($SiO_2$) on the exposed outside surface of the timepiece dial so that the zinc sulfide layer (ZnS) is on the outside offers excellent adhesion with the polycarbonate base layer and sufficient durability for a timepiece dial.

Satisfactory results were not obtained with the timepiece dials described in the comparison samples, however. More specifically, the timepiece dials described for comparison are unable to simultaneously provide an outstanding appearance, outstanding transparency to electromagnetic waves, and durability sufficient for use as a timepiece dial.

A timepiece as shown in FIG. 4 was also constructed using the timepiece dials described in the examples and comparison samples. When the resulting timepieces were evaluated using the same methods and tests used with the timepiece dials, the same results were also achieved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No. 2006-047540, filed Feb. 23, 2006 is expressly incorporated by reference herein.

What is claimed is:

1. A timepiece dial comprising:

a base member made primarily of polycarbonate;

a silicon compound layer made primarily of a silicon oxide compound and having a side facing the base member; and a zinc sulfide compound layer made primarily of a zinc sulfide compound and rendered on an opposite side of the silicon compound layer as the side facing the base member.

2. The timepiece dial described in claim 1, wherein the silicon compound layer is primarily $SiO_2$.

3. The timepiece dial described in claim 1, wherein the thickness of the silicon compound layer is 20 nm to 200 nm.

4. The timepiece dial described in claim 1, wherein the thickness of the zinc sulfide compound layer is 10 nm to 100 nm.

5. The timepiece dial described in claim 1, wherein the combined thickness of the silicon compound layer and the zinc sulfide compound layer is 50 nm to 250 nm.

6. The timepiece dial described in claim 1, further comprising a polarizer having the ability to polarize incident light disposed to the opposite side of the base member as the side on which the zinc sulfide compound layer is disposed.

7. The timepiece dial described in claim 6, further comprising a color layer composed of a material including a coloring agent between the base member and the polarizer.

8. The timepiece dial described in claim 7, wherein the color layer is made from a material that is sticky and adhesive.

9. The timepiece dial described in claim 6, further comprising a diffusion layer composed of a material containing a diffusion agent having the ability to disperse incident light, the diffusion layer being disposed between the base member and the polarizer.

10. The timepiece dial described in claim 9, wherein the diffusion layer is made from a material that is sticky and adhesive.

11. The timepiece dial described in claim 1, wherein the color of the surface on the side to which the zinc sulfide compound layer is disposed has an a* value of −10 to 10 and a b* value of −10 to 10 in the L*a*b* color space defined in JIS Z 8729.

12. A timepiece comprising the timepiece dial described in claim 1.

* * * * *